(12) United States Patent
Iizuka et al.

(10) Patent No.: US 11,358,574 B2
(45) Date of Patent: Jun. 14, 2022

(54) BRAKE CONTROL DEVICE FOR MOTORCYCLE

(71) Applicants: HONDA MOTOR CO., LTD., Tokyo (JP); HITACHI ASTEMO, LTD., Hitachinaka (JP)

(72) Inventors: Chikashi Iizuka, Wako (JP); Makoto Toda, Wako (JP); Hiroki Kitagawa, Wako (JP); Tetsuya Hasegawa, Tomi (JP); Nobuyuki Kodaira, Tomi (JP)

(73) Assignees: Honda Motor Co., Ltd., Tokyo (JP); Hitachi Astemo Ltd., Ibaraki (JP)

( * ) Notice: Subject to any disclaimer, the term of this patent is extended or adjusted under 35 U.S.C. 154(b) by 85 days.

(21) Appl. No.: 16/089,691

(22) PCT Filed: Mar. 31, 2016

(86) PCT No.: PCT/JP2016/060717
§ 371 (c)(1),
(2) Date: Sep. 28, 2018

(87) PCT Pub. No.: WO2017/168692
PCT Pub. Date: Oct. 5, 2017

(65) Prior Publication Data
US 2019/0135248 A1    May 9, 2019

(51) Int. Cl.
*B60T 8/17* (2006.01)
*B60T 8/1755* (2006.01)

(52) U.S. Cl.
CPC ........ *B60T 8/1706* (2013.01); *B60T 8/17555* (2013.01); *B60T 2201/16* (2013.01); *B60T 2210/22* (2013.01); *B60T 2230/03* (2013.01)

(58) Field of Classification Search
CPC .. B60T 8/1764; B60T 8/1763; B60T 2201/03; B60T 8/1755; B60T 8/17552;
(Continued)

(56) References Cited

U.S. PATENT DOCUMENTS 4,989,922 A    2/1991  Pickenhahn et al.
5,217,087 A *  6/1993  Ikegami ................. B60Q 1/122
                                                    180/219
(Continued)

FOREIGN PATENT DOCUMENTS

DE    10 2011 076 633 A1    3/2012
EP         0 370 469 A2     5/1990
(Continued)

OTHER PUBLICATIONS

English translation of JP2004155412A (Year: 2004).*
(Continued)

*Primary Examiner* — Robert A. Siconolfi
*Assistant Examiner* — Mahbubur Rashid
(74) *Attorney, Agent, or Firm* — Carrier Blackman & Associates, P.C.; Joseph P. Carrier; Jeffrey T. Gedeon

(57) ABSTRACT

In this brake control device for a motorcycle, a deceleration threshold value calculation unit limits target wheel deceleration to a threshold value or less on the basis of a bank angle estimated by a bank angle calculation unit. Thus, the behavior of the vehicle body during turning of the motorcycle can be made more stable so as not to cause discomfort to a driver.

7 Claims, 9 Drawing Sheets

(58) Field of Classification Search
CPC .... B60T 2230/02; B60T 8/175; B60T 8/1706; B60T 8/1766; B60T 2210/14; B60T 2210/22; B60T 2230/03; B60T 8/17551; B60T 8/17554; B60T 8/17555; B60T 8/261; B60T 8/3225
See application file for complete search history.

(56) References Cited

U.S. PATENT DOCUMENTS

| | | | | |
|---|---|---|---|---|
| 5,244,259 A | * | 9/1993 | Pickenhahn | B60T 8/1706 303/137 |
| 5,297,859 A | * | 3/1994 | Suzuki | B60T 8/1706 303/137 |
| 5,411,325 A | * | 5/1995 | Tanaka | B60T 8/1706 303/150 |
| 5,444,625 A | * | 8/1995 | Tanaka | B60T 8/1706 180/197 |
| 5,445,443 A | | 8/1995 | Hauser et al. | |
| 5,758,305 A | * | 5/1998 | Otsubo | B60T 8/172 303/150 |
| 6,268,794 B1 | * | 7/2001 | Tzanev | B62J 6/05 340/475 |
| 7,469,975 B2 | * | 12/2008 | Wagner | B60K 28/16 303/137 |
| 7,599,779 B2 | * | 10/2009 | Watanabe | B60G 17/0164 267/188 |
| 9,189,454 B2 | * | 11/2015 | Fukushima | G06F 17/00 |
| 9,387,764 B2 | * | 7/2016 | Matsuda | B60L 50/66 |
| 2007/0186705 A1 | * | 8/2007 | Suzuki | F16H 61/16 74/335 |
| 2009/0132133 A1 | * | 5/2009 | Kojima | F16H 61/12 701/52 |
| 2010/0017077 A1 | * | 1/2010 | Oshima | B60K 28/16 701/51 |
| 2010/0168958 A1 | * | 7/2010 | Baino | B60Q 1/12 701/36 |
| 2011/0073401 A1 | * | 3/2011 | Hanawa | B62M 23/02 180/220 |
| 2013/0226381 A1 | * | 8/2013 | Yates, III | B62M 7/02 701/22 |
| 2013/0238206 A1 | | 9/2013 | Lemejda | |
| 2014/0058609 A1 | * | 2/2014 | Matsuda | B60L 50/66 701/22 |
| 2014/0200780 A1 | * | 7/2014 | Watanabe | B60T 8/17554 701/68 |
| 2015/0127240 A1 | * | 5/2015 | Nozawa | B62K 11/00 701/82 |
| 2015/0183480 A1 | * | 7/2015 | Ono | B60W 30/18145 701/72 |
| 2015/0274019 A1 | * | 10/2015 | Matsuda | B60T 8/246 701/22 |
| 2016/0161526 A1 | * | 6/2016 | Miki | B60T 8/172 701/124 |
| 2017/0101147 A1 | * | 4/2017 | Hasegawa | B62J 6/04 |

FOREIGN PATENT DOCUMENTS

| | | | | |
|---|---|---|---|---|
| EP | 1842755 A1 | * | 10/2007 | ............ B60T 8/1706 |
| EP | 2 944 526 A1 | | 11/2015 | |
| JP | 2004155412 A | * | 6/2004 | ............ B60T 8/1706 |
| JP | 2010012903 A | * | 1/2010 | |
| JP | 2010195087 A1 | * | 9/2010 | |
| JP | 2015-214321 A | | 12/2015 | |
| WO | 2010/116641 A1 | | 10/2010 | |

OTHER PUBLICATIONS

PCT/ISA/210 from International Application PCT/JP2016/060717 and the English translation thereof.
Extended European search report dated Feb. 18, 2019 issued over the corresponding EP Patent Application No. 16896909.5.

* cited by examiner

BRAKE CONTROL DEVICE FOR MOTORCYCLE

TECHNICAL FIELD

The present invention relates to brake control devices for motorcycles configured to control brakes while limiting slip of wheels to predetermined ranges.

BACKGROUND ART

In a case where a rider applies the brakes to a vehicle such as a motorcycle on a slippery road surface, ABS (Antilock Brake System) control, in which brake fluid pressure is adjusted intermittently, has been performed to prevent the brakes from locking. In some techniques, the ABS control is activated not only while the vehicle travels straight ahead but also while the vehicle corners (turns).

For example, Japanese Laid-Open Patent Publication No. 2015-214321 discloses a technique, relating to brake control of a vehicle during turning, of detecting wheel speeds for the brake control, calculating a slip ratio or an amount of slip using the detected wheel speeds, and controlling the braking force to limit the slip to a predetermined range.

Moreover, International Publication No. WO 2012/086289 discloses a technique of setting the maximum braking force on front and rear wheels of a vehicle and limiting a braking force to a target braking force which is lower than the set maximum braking force.

SUMMARY OF INVENTION

The inventors have found out through their investigation that when a motorcycle turns, a rider experiences, compared with when the motorcycle travels straight ahead, a greater effect of an external force caused by braking operation and acting on handlebars the rider grips. If the brake fluid pressure is controlled under such a circumstance, the rider may feel discomfort (have an unusual sensation) during turning of the motorcycle.

The present invention has the object of providing a brake control device for a motorcycle performing brake control enabling a rider to feel no or less effect of an external force acting on handlebars during turning of a vehicle, whereby braking during tuning of the vehicle is stabilized and a feeling of safety is created in the rider.

A brake control device for a motorcycle according to the present invention includes deceleration estimating unit configured to estimate deceleration of a vehicle, bank angle estimating unit configured to estimate a bank angle of the vehicle, and slip preventing unit configured to detect slip of a wheel and to control a brake of the vehicle to limit the slip to a predetermined range, and has the following aspects:

First aspect: The brake control device further includes a deceleration limiting unit configured to control the brake to limit the deceleration to a predetermined range based on the estimated bank angle.

Second aspect: When the slip exceeds the predetermined range while the deceleration limiting unit controls the brake, the brake control by the deceleration limiting unit is switched to the brake control by the slip preventing unit.

Third aspect: The deceleration limiting unit controls only the brake of a front wheel of the motorcycle.

Fourth aspect: The deceleration limiting unit limits the deceleration to a smaller value as the estimated bank angle increases.

Fifth aspect: The deceleration limiting unit limits the deceleration according to the estimated bank angle.

Sixth aspect: The deceleration limiting unit does not perform a process of limiting the deceleration when an absolute value of the estimated bank angle is less than or equal to a first predetermined value.

Seventh aspect: The deceleration limiting unit limits the deceleration to a certain value or less when an absolute value of the estimated bank angle is less than or equal to a second predetermined value.

According to the first aspect of the present invention, the brake control device has a control mode in which the slip preventing unit performs the brake control to limit the slip to a predetermined range and a control mode in which the deceleration limiting unit performs the brake control to limit the deceleration to a predetermined range based on the bank angle. Thus, according to the first aspect, the brake control may be performed not only to prevent the slip but also to limit the deceleration to a predetermined range.

More specifically, according to a study by the inventors, the brake control to limit the slip by the slip preventing unit during turning of the motorcycle may cause a significant effect of the external force acting on the handlebars and thus cause discomfort in the rider. Thus, to reduce the discomfort of the rider, the brake control needs to start at an early stage before the brake control according to the slip prevention starts.

Consequently, according to the first aspect, the brake control based on the deceleration is performed at a timing prior to the timing when the brake control with slip prevention is performed. In this manner, increasing chances of the deceleration-based brake control at a relatively early timing enables the braking force to be controlled such that the rider does not feel discomfort with the effect of the external force acting on the handlebars during turning of the motorcycle. Stabilizing the braking during turning may also create an additional sense of safety in the rider.

According to the second aspect of the present invention, the brake control by the deceleration limiting unit coexists with the brake control by slip preventing unit. This enables the brake control by the deceleration limiting unit to be suspended and temporarily switched to the brake control by the slip preventing unit when the slip increases and temporarily exceeds a predetermined range during the brake control by the deceleration limiting unit. As a result, the brake control to prevent the slip may take precedence.

According to the third aspect of the present invention, the deceleration limiting unit controls only the brake of the front wheel. This allows the brake of a rear wheel to receive input of braking operation by the rider from when the braking on the front wheel starts until the braking on the rear wheel starts even in a case where the control by the deceleration limiting unit can be activated. As a result, the rider scarcely feels discomfort when the rider operates the brake of the rear wheel.

According to the fourth aspect of the present invention, as the absolute value of the bank angle increases, the limit value of the deceleration causing the rider to feel discomfort with the effect of the external force acting on the handlebars decreases. This enables the deceleration to be controlled into appropriate values.

According to the fifth aspect of the present invention, the deceleration causing the rider to feel no effect of the external force acting on the handlebars is created as a map corresponding to the bank angles. Thus, the brake control suitable for the characteristics of the motorcycle may be readily performed using the map.

According to the sixth aspect of the present invention, the motorcycle is in a substantially upright position when the absolute value of the bank angle is less than or equal to the first predetermined value. In this state, a larger braking force may be applied by not limiting the deceleration. As a result, an appropriate brake control may be performed without degrading the usability of the brakes by the rider.

According to the seventh aspect of the present invention, the deceleration is limited to a certain value or less at a very large bank angle of which the absolute value is greater than or equal to the second predetermined value. With this, a higher priority is placed on the braking force than on prevention of discomfort felt by the rider due to the effect of the external force acting on the handlebars. As a result, more stable brake controllability may be achieved.

DESCRIPTION OF EMBODIMENT

A preferred embodiment of the present invention will be described in detail below with reference to the accompanying drawings.

Overall Configuration of the Embodiment

Figure 1:
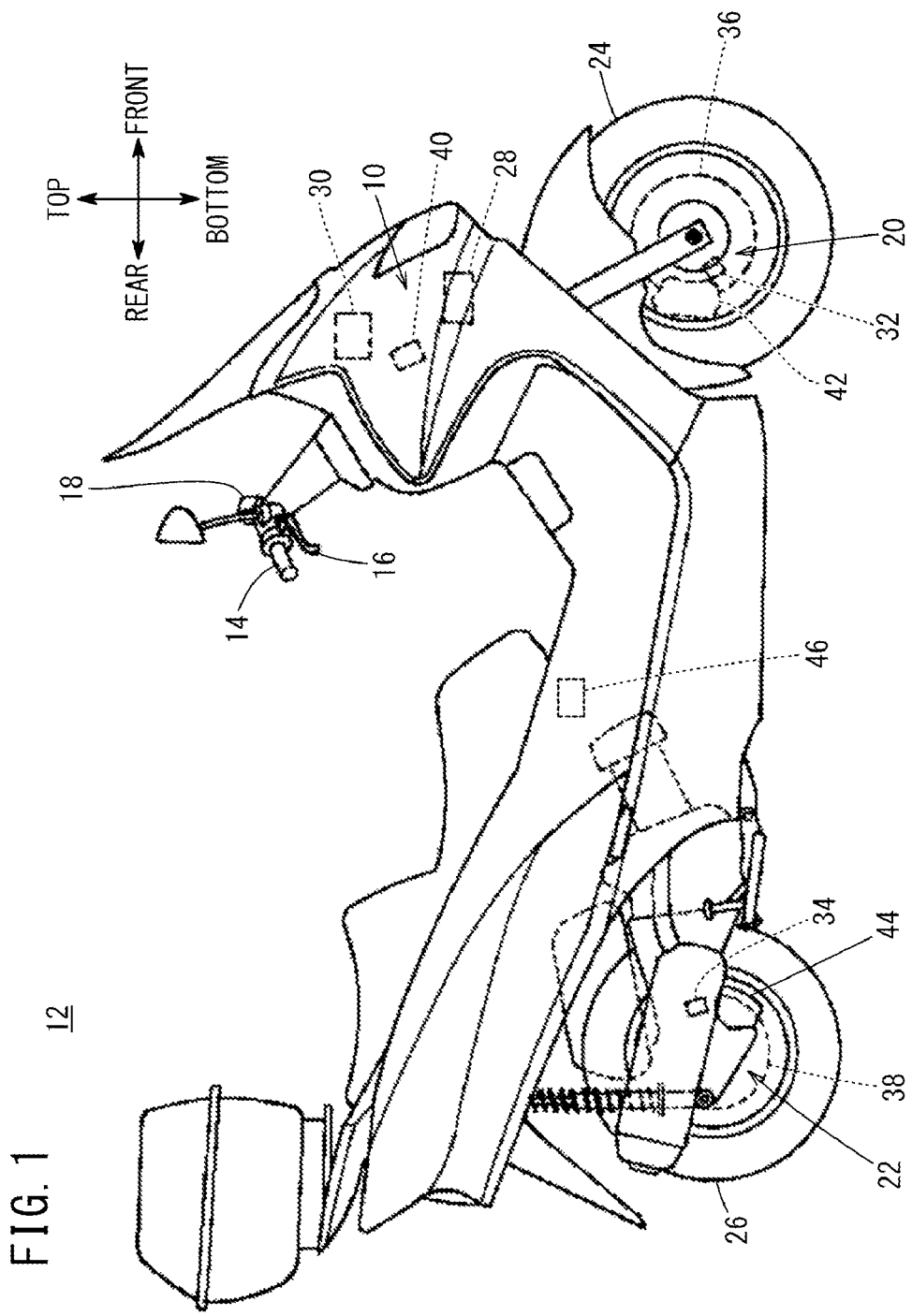
FIG. 1 is a right side view of a motorcycle to which a brake control device according to this embodiment is applied.

A brake control device 10 for a motorcycle according to this embodiment (hereinafter, also referred to as the brake control device 10 according to this embodiment) will now be described with reference to FIGS. 1 and 2.

The brake control device 10 according to this embodiment is applied to a motorcycle 12. FIG. 1 is a right side view of the motorcycle 12.

The motorcycle 12 includes right and left brake levers 16 attached to handlebars 14, right and left master cylinders 18 that generate brake fluid pressure when a rider squeezes the brake levers 16, a disc brake 20 for a front wheel and a disc brake 22 for a rear wheel activated by the brake fluid pressure from the right and left master cylinders 18, and a front wheel 24 and a rear wheel 26 braked by the disc brakes 20 and 22. In FIG. 1, the brake lever 16 and the master cylinder 18 on the right side are illustrated, and the brake lever and the master cylinder on the left side are omitted.

The motorcycle 12 further includes an ABS pressure adjustment unit 28 that prevents the front wheel 24 and the rear wheel 26 from locking up during braking, a control unit 30 that controls the ABS pressure adjustment unit 28, and a front wheel rotational speed sensor 32 and a rear wheel rotational speed sensor 34 that detect rotational speeds (wheel speeds) of the front wheel 24 and the rear wheel 26 and output the rotational speeds to the control unit 30. A brake disc 36 is attached to the front wheel 24, and a brake disc 38 is attached to the rear wheel 26. Here, an ABS is a device configured to prevent the front wheel 24 and the rear wheel 26 from locking up during hard braking or during braking on slippery road surfaces.

The disc brake 20 for the front wheel includes the brake disc 36, brake pads (not illustrated) with the brake disc 36 disposed in between, a piston movably fit in a cylinder (not illustrated) for pressing the brake pads, and a brake caliper 42 housing the brake pads and the piston. The disc brake 22 for the rear wheel includes the brake disc 38, brake pads (not illustrated) with the brake disc 38 disposed in between, a piston fit in a cylinder (not illustrated) for pressing the brake pads, and a brake caliper 44 housing the brake pads and the piston.

The motorcycle 12 further includes an orientation detecting sensor 46 such as a gyroscope and an accelerometer that detects the orientation of the vehicle body.

The brake control device 10 according to this embodiment includes the ABS pressure adjustment unit 28, the control unit 30, the front wheel rotational speed sensor 32, the rear wheel rotational speed sensor 34, a valve control unit 40, the orientation detecting sensor 46, and the like. The control unit 30 controls the ABS pressure adjustment unit 28 and the valve control unit 40. The front wheel rotational speed sensor 32 and the rear wheel rotational speed sensor 34 are electromagnetic induction sensors including magnets and coils and attached to the vicinities of the front wheel 24 and the rear wheel 26 to respectively detect the wheel speeds of the front wheel 24 and the rear wheel 26.

Figure 2:
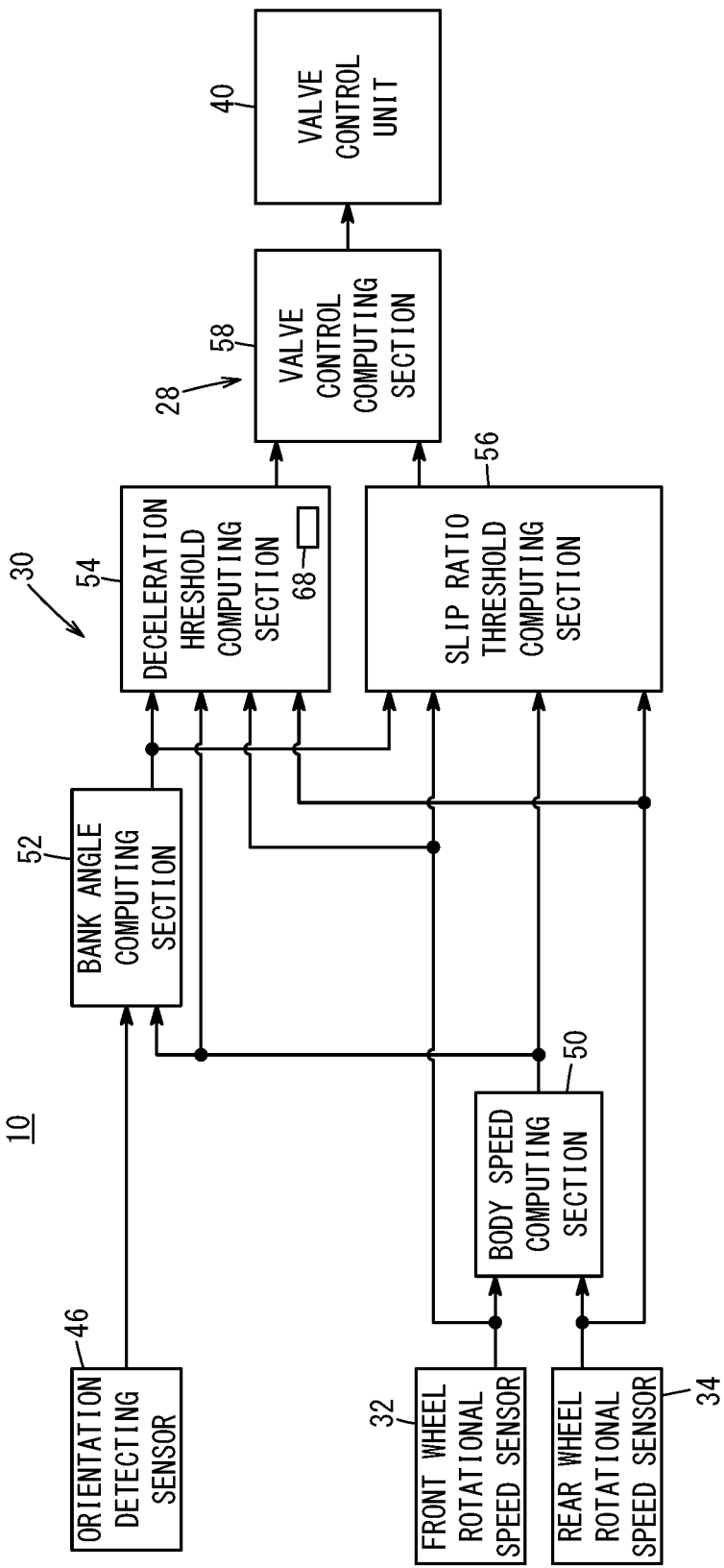
FIG. 2 is a block diagram of the brake control device illustrated in FIG. 1.

As illustrated in FIG. 2, the control unit 30 in the brake control device 10 includes a body speed computing section 50, a bank angle computing section 52 (bank angle estimating unit), a deceleration threshold computing section 54 (deceleration estimating unit and deceleration limiting unit), and a slip ratio threshold computing section 56 (slip preventing unit). Moreover, the ABS pressure adjustment unit 28 corresponds to a valve control computing section 58.

The body speed computing section 50 calculates the speed of the vehicle body based on the wheel speeds input from the front wheel rotational speed sensor 32 and the rear wheel rotational speed sensor 34. The bank angle computing section 52 calculates the bank angle α of the motorcycle 12 based on the speed of the vehicle body of the motorcycle 12, and the angular velocity and the acceleration input from the orientation detecting sensor 46. The deceleration threshold computing section 54 calculates the deceleration A of the motorcycle 12 based on the wheel speeds input from the front wheel rotational speed sensor 32 and the rear wheel rotational speed sensor 34 and performs a process of limiting the deceleration A based on the deceleration A and the bank angle α (brake control based on the deceleration A (ABS control)). The slip ratio threshold computing section 56 calculates slipping (slip ratio or the amount of slip) of the front wheel 24 and the rear wheel 26 based on the speed of the vehicle body and performs a process of limiting the deceleration A based on the calculated slipping (brake control based on the slipping (ABS control)).

The valve control computing section 58 determines a brake control mode of the motorcycle 12 based on the results of processes performed by the deceleration threshold computing section 54 and the slip ratio threshold computing section 56 and outputs signals for opening and closing valves that control the brake fluid pressure to the valve control unit 40 based on the determined brake control mode. By opening and closing the valves based on the opening and closing signals, the valve control unit 40 adjusts the brake fluid pressure and thus controls the braking force of the disc brakes 20 and 22.

Problem to Be Solved by the Embodiment

Prior to explanation of operations of the brake control device 10 configured as above, a problem to be solved by the brake control device 10 will be described with reference to FIGS. 3A to 4C.

Figure 3A:
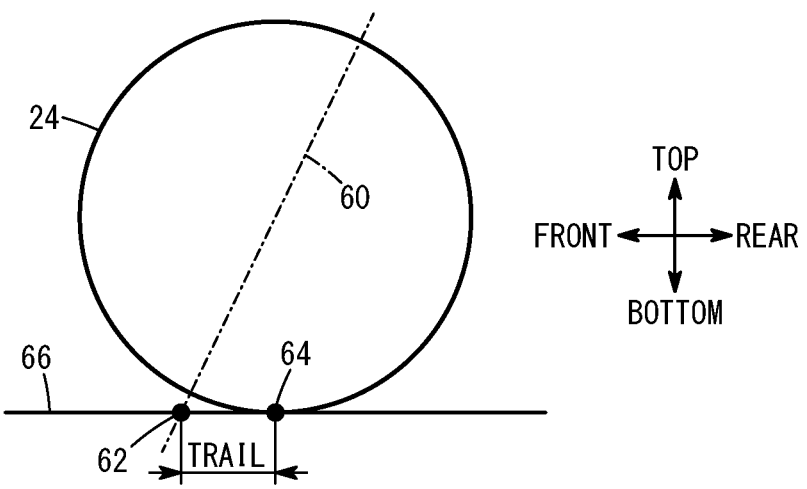
FIG. 3A is a schematic left side view of a front wheel.
Figure 3B:
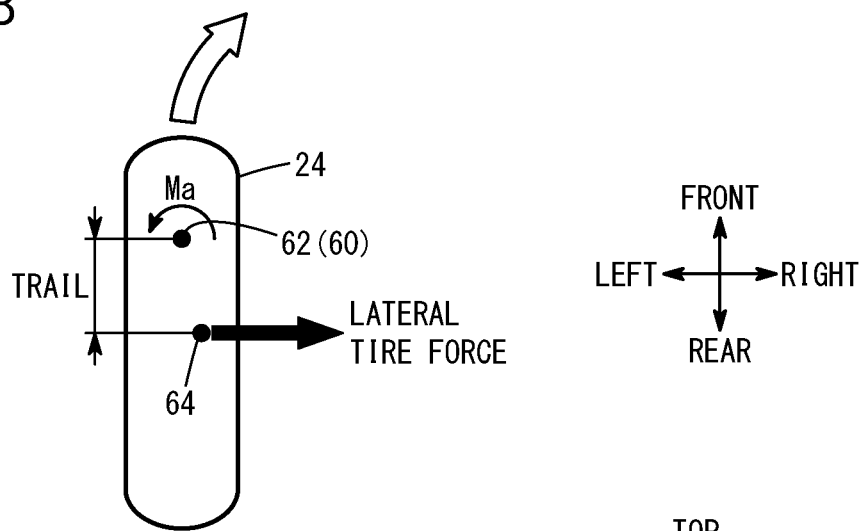
FIG. 3B is a schematic plan view of the front wheel.
Figure 3C:
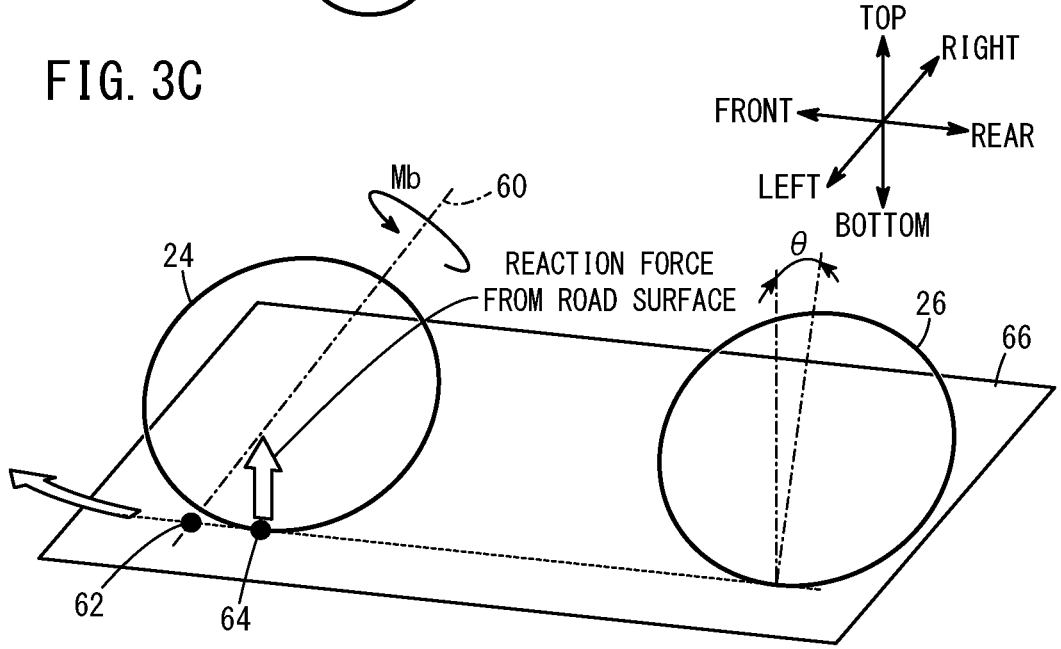
FIG. 3C is a schematic perspective view of the front wheel and a rear wheel.

FIGS. 3A to 3C illustrate forces acting on a steering axis 60 while the motorcycle 12 turns.

As schematically illustrated in FIG. 3A, the steering axis 60 is arranged to pass through the center of the front wheel 24 and to incline backward. In this case, when the point at which the steering axis 60 and a road surface 66 intersect is defined as an intersection 62 and the point at which the front wheel 24 comes into contact with the road surface 66 is defined as a ground contact point 64, the distance between the intersection 62 and the ground contact point 64 is defined as a trail.

Moreover, as illustrated in FIG. 3B, when the motorcycle 12 turns to the right forward, the rider turns the handlebars 14 to the right to turn the motorcycle 12 while inclining the motorcycle 12 to the right by an angle θ with respect to the road surface 66 (see FIG. 3C).

In this case, since the handlebars 14 are turned to the right and the vehicle body is inclined rightward by the angle θ, a force directed from the ground contact point 64 to the right (lateral tire force) acts on the front wheel 24. A moment Ma acts as a force returning the steering axis 60 (the direction of the handlebars 14) to the straight-ahead direction of the motorcycle 12. In addition, a moment Mb due to the reaction force the front wheel 24 receives from the road surface 66 acts on the steering axis 60. The moment Mb acts as a force further turning the steering axis 60 to the turning direction (inclination direction). Thus, while the motorcycle 12 turns, the turning state is kept stable mainly at the handlebar steering angle and the body inclination angle where the two moments Ma and Mb are in balance.

Figure 4A:
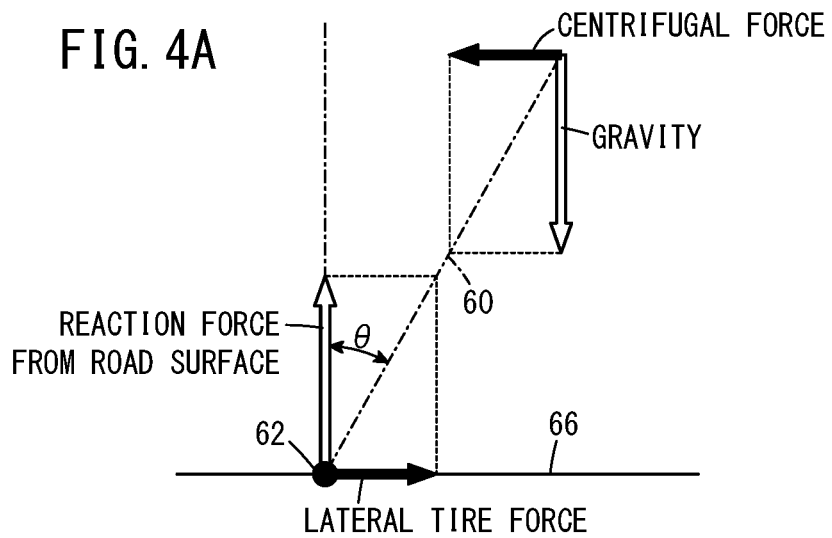
FIG. 4A is an explanatory diagram illustrating a balance between forces acting on the motorcycle during turning.

As a result, as illustrated in FIG. 4A, rightward lateral tire force and reaction force from the road surface (upward reaction force acting on the front wheel 24 from the road surface 66 against the gravity acting on the front wheel 24) act on the intersection 62 side of the steering axis 60 during normal turning. In addition, a leftward centrifugal force and downward gravity act on the handlebars 14 (see FIG. 1) side of the steering axis 60. Thus, during the normal turning, the behavior of the motorcycle 12 becomes stable due to the balanced forces.

Figure 4B:
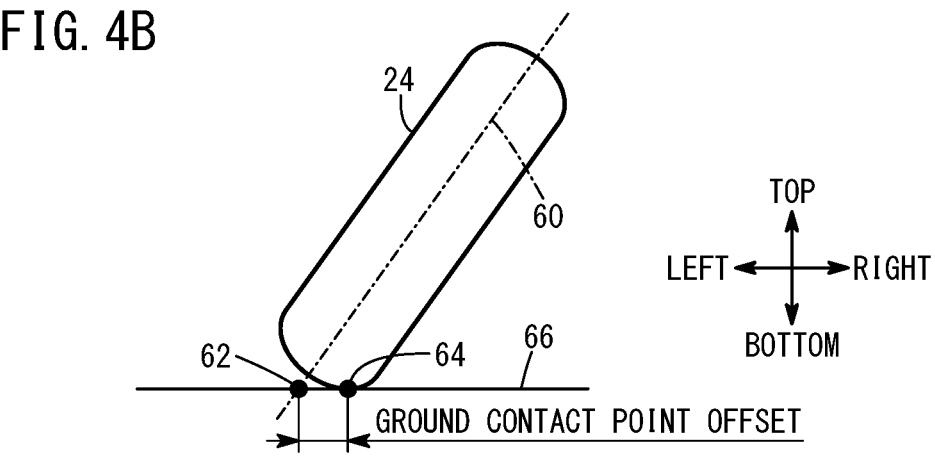
FIG. 4B is a schematic rear view of the front wheel.
Figure 4C:
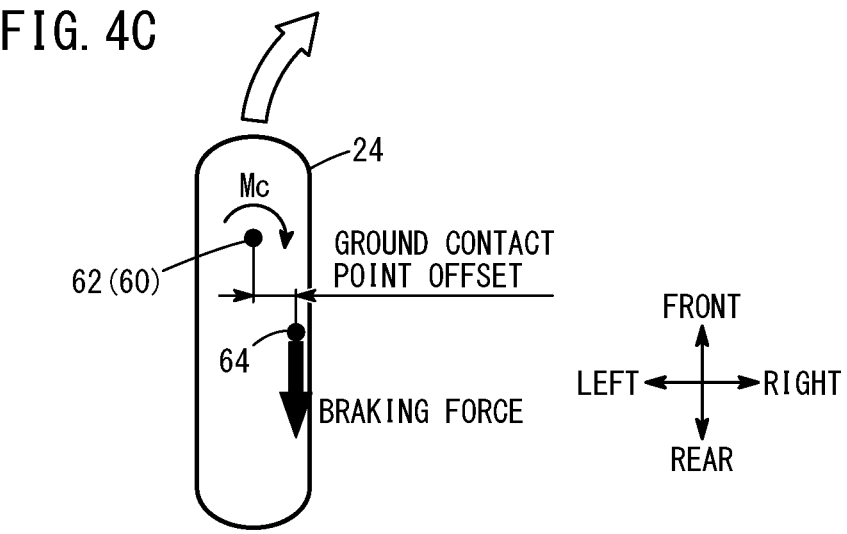
FIG. 4C is a schematic plan view of the front wheel.

As illustrated in FIGS. 4B and 4C, when a braking force (braking force of the brake) acts on the front wheel 24 due to ABS control while the motorcycle 12 turns, torsional torque is generated around the steering axis 60 of the front wheel 24. As illustrated in FIG. 4B, when the motorcycle 12 turns, the ground contact point 64 is offset to the right. As illustrated in FIG. 4C, the braking force acting on the ground contact point 64 generates a moment Mc, which causes the front wheel 24 to rotate clockwise with respect to the steering axis 60 with the ground contact point 64 being the point of application. The torsional torque is caused by the moment Mc.

When the handlebars 14 are turned due to the torsional torque, a force directed in the upright direction acts on the vehicle body. The force is a cause for an external force acting on the handlebars 14. When the amount of turning of the handlebars 14 exceeds a permissible value, the rider feels the effect of the external force acting on the handlebars 14 as discomfort.

Specific factors affecting the behavior of the vehicle body due to the activation of the ABS control as above may include the followings:

(1) An increase in the braking force may occur due to an increase in the brake fluid pressure. In this case, the turning force on the steering axis 60 is increased, and thus a force causing the handlebars 14 to wobble in the turning direction and the vehicle body to stand upright is applied.

(2) A reduction in the braking force may occur due to a reduction in the brake fluid pressure. In this case, the turning force on the steering axis 60 is reduced, and thus the steering axis 60 is directed in the straight-ahead direction. As a result, a force causing the handlebars 14 to wobble in the straight-ahead direction and the vehicle body to fall is applied.

(3) Deep slip may occur. In this case, the tire braking force is reduced, and the turning force on the steering axis 60 is reduced. Thus, the steering axis 60 is directed in the straight-ahead direction, and, also in this case, a force causing the handlebars 14 to wobble in the straight-ahead direction and the vehicle body to fall is applied.

These three factors repeatedly occur or change as time passes and cause the external force acting on the handlebars 14 to affect the rider's feelings. In other words, the braking force changing by a certain amount or more in a short time causes changes in magnitude of the torsional torque, and thus may cause a sense of discomfort to the rider.

Operations of the Embodiment

Thus, the inventors have investigated whether it is possible to perform a brake control (ABS control) method enabling the rider to feel no effect of the external force acting on the handlebars 14 while the motorcycle 12 turns. As a result, the inventors have reached the conclusion that the brake control needs to be performed based not on the slipping (slip ratio or the amount of slipping) but on the deceleration A of the motorcycle 12 to perform the brake control enabling the rider not to feel effect of the external force acting on the handlebars 14 as discomfort. Such a brake control reduces the changes in the braking force during the brake control, allowing the stability of the vehicle body behavior to attain a level where the rider does not feel any discomfort.

The operations of the brake control based on the deceleration A will now be described with reference to FIGS. 1, 2, and 5 to 9.

Figure 5:
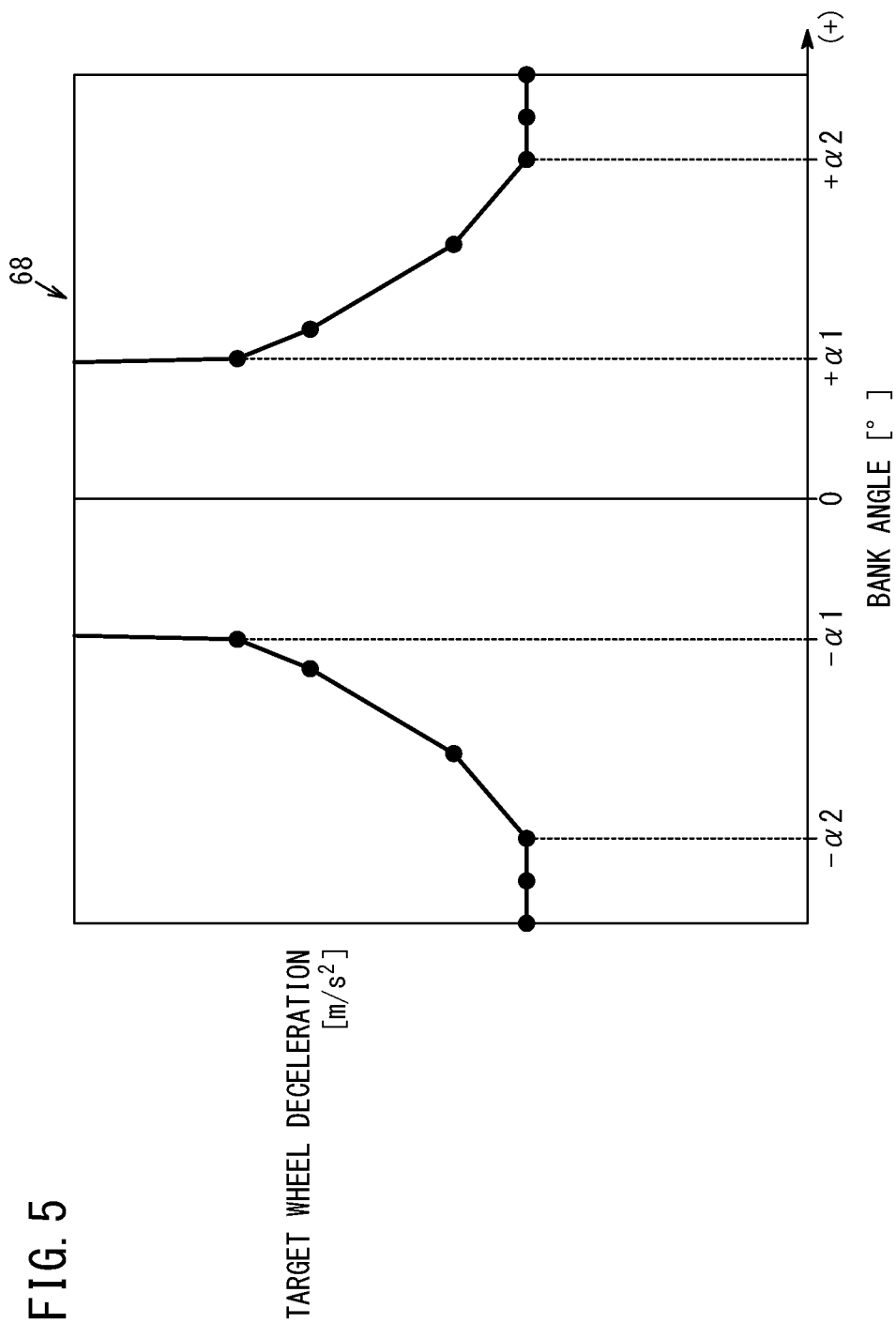
FIG. 5 is a map illustrating a relationship between a bank angle and deceleration.

The deceleration threshold computing section 54 includes a map 68 illustrated in FIG. 5. On the map 68, where the horizontal axis represents the bank angle α and the vertical axis represents the deceleration A, points at which wobbling of the handlebars felt by a test rider actually disappeared are plotted and connected with straight lines. Thus, the test rider does not feel discomfort with the effect of the external force acting on the handlebars 14 in the area at or below the values (deceleration thresholds) of the straight lines connecting the points. More specifically, when the test rider riding the motorcycle 12 on the road surface 66 turned the motorcycle 12, a lower limit (threshold) of the deceleration A at which discomfort caused by the external force acting on the handlebars 14 disappeared was measured at each bank angle α, and the measured thresholds of the deceleration A have been plotted on the map 68.

The motorcycle 12 leans to the left or right with respect to the upright state (α=0°) during turning. Consequently, the thresholds of the deceleration A (target wheel deceleration at which discomfort caused by the effect of the external force acting on the handlebars 14 disappears) according to the left and right bank angles α are mapped in two lines (threshold lines) on the map 68. Although only one threshold line is illustrated for each of the left and right bank angles α on the map 68, the threshold lines are actually determined for each speed of the motorcycle 12. Although the map 68 relates to the deceleration A of the front wheel 24 in this embodiment, the map 68 may relate to the deceleration of the rear wheel 26.

The deceleration threshold computing section 54 refers to the map 68 and sets a predetermined deceleration A at or below the threshold line as the deceleration (target wheel deceleration) at the time when the ABS control starts for the bank angle α calculated by the bank angle computing section 52. In this case, the deceleration threshold computing section 54 receives the wheel speeds from the front wheel rotational speed sensor 32 and the rear wheel rotational speed sensor 34 and calculates a current deceleration A of the motorcycle 12 using the input wheel speeds. When the calculated deceleration A reaches the target wheel deceleration, the deceleration threshold computing section 54 determines to activate the ABS control. This enables the ABS control to start while the rider does not feel discomfort with the external force acting on the handlebars 14.

Moreover, the motorcycle 12 is in a substantially upright position when being in the range where the absolute value of the bank angle α is less than or equal to a first predetermined value α1 (−α1≤α≤+α1) on the map 68. In this state, the process of limiting the ABS control according to the deceleration A using the map 68 is not performed. Thus, the brake control device 10 applies to the disc brakes 20 and 22 the braking force in response to an operational amount of the brake levers 16 which indicates how much the rider has operated the brake levers 16.

Furthermore, the deceleration A is limited to a certain value or less at a very large bank angle α of which the absolute value is greater than or equal to a second predetermined value α2 (α≤−α2 or +α2≤α) on the map 68. In this case, the motorcycle 12 considerably leans to the left or right rather than the upright position. Thus, the brake control device 10 places a higher priority on the braking force than on prevention of discomfort felt by the rider because of the wobbling of the handlebars.

In this manner, regarding the activation of the ABS control during turning of the motorcycle 12, the brake control device 10 controls the units relating to the brake control to start, for any bank angle α, the ABS control at the deceleration A (target wheel deceleration) that is less than or equal to the threshold. A processing result (target wheel deceleration and the like) obtained at the deceleration threshold computing section 54 is output from the deceleration threshold computing section 54 to the valve control computing section 58.

Here, improvements desired from the known slip-based ABS control compared with the above-described deceleration A-based ABS control will be further described.

When the motorcycle 12 is turned on a dry road surface 66, the slip may increase during braking, and before the brake control prevents the slip, the effect of the external force acting on the handlebars 14 could be such that the rider feels discomfort with the effect. The rider may feel discomfort with the effect of the external force acting on the handlebars 14 occurring during turning even when the turning state of the vehicle is stable. Accordingly, eliminating or reducing discomfort felt by the rider due to the effect of the external force acting on the handlebars 14 and thus assuring safety of the rider allow the rider to further realize the convenience of the brake control during turning.

As explained above, the deceleration A is limited to a predetermined range in this embodiment. On the other hand, the method of performing the brake control to reduce the slip ratio or the amount of slipping requires highly advanced control techniques to fulfill the required performance. Moreover, in a case where the brake fluid pressure is the one to be controlled, a highly accurate pressure sensing is required; therefore, it is difficult to find a balance between accuracy and costs. That is, the brake control method based on the slip is difficult to apply in the area where the effect of the external force acting on the handlebars 14 occurs easily even though there is no slip. Moreover, according to the brake control method based on the brake fluid pressure, it is difficult to find a balance between costs and accuracy of detecting the braking force actually occurring on the front wheel 24 and the rear wheel 26.

Figure 6:
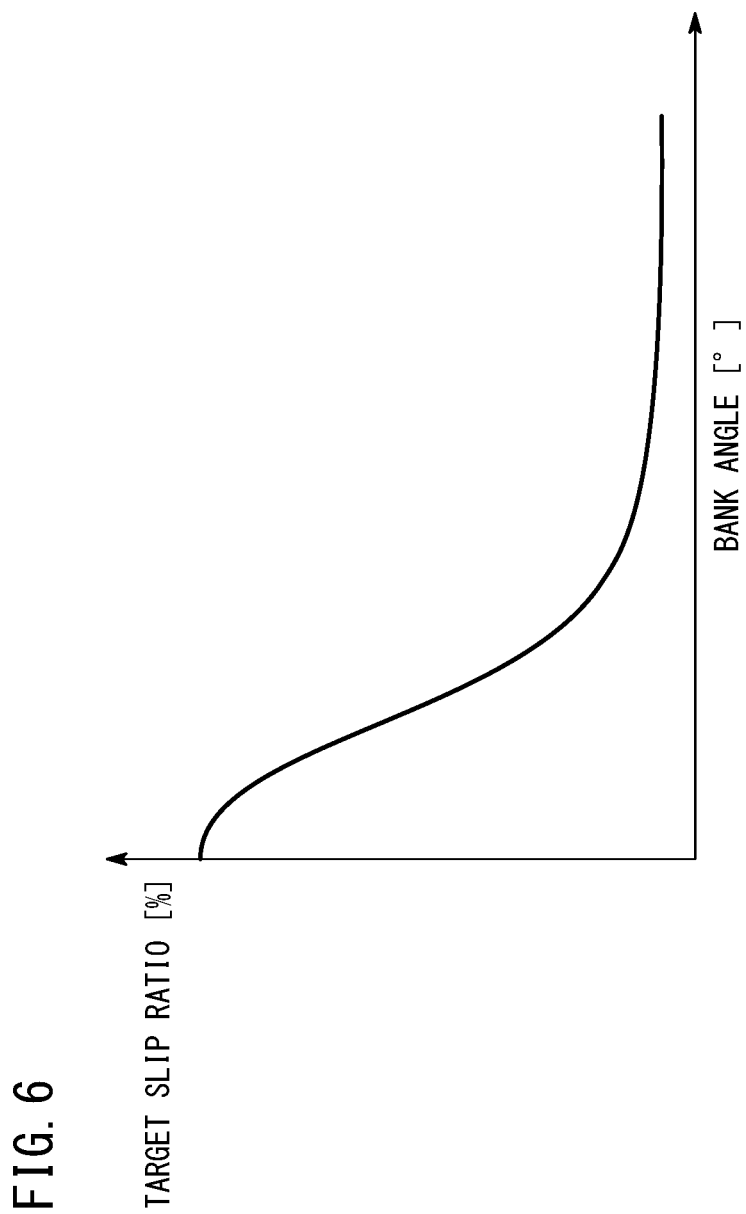
FIG. 6 is a map illustrating a relationship between the bank angle and a slip ratio.

Moreover, as in the known technology, the brake control device 10 is able to activate, for any bank angle α, the ABS control based on the magnitude of the slip. FIG. 6 is a map illustrating the relationship between slip ratio S and the bank angle α. On the map in FIG. 6, a threshold line of the slip ratio S decreases as the bank angle α increases. This indicates that the ABS control should be activated within the range of the slip ratio S at or below the threshold line for any bank angle α.

Although only one threshold line is illustrated in FIG. 6, there is actually one threshold line for each of the front wheel 24 and the rear wheel 26. Moreover, also on the map in FIG. 6, the threshold line is set according to the speed of the vehicle body. Thus, the map in FIG. 6 is an example, and there are actually multiple threshold lines.

The slip ratio threshold computing section 56 refers to the map in FIG. 6 and sets the slip ratio S that is at or below the threshold line as a target slip ratio used at the time when the ABS control starts, for the bank angle α calculated by the bank angle computing section 52. In this case, the slip ratio threshold computing section 56 receives the speed of the vehicle body calculated by the body speed computing section 50 and calculates a current slip ratio S using the speed of the vehicle body. When the calculated slip ratio S reaches the target slip ratio, the slip ratio threshold computing section 56 determines the activation of the ABS control. The processing result (target slip ratio and the like) obtained at the slip ratio threshold computing section 56 is output from the slip ratio threshold computing section 56 to the valve control computing section 58.

In this manner, the brake control device 10 according to this embodiment has achieved the brake control including the control of limiting the deceleration A in addition to the existing control of the slip ratio or the amount of slipping during turning.

The valve control computing section 58 determines which control mode should be performed, from among (1) activation of the ABS control based on the target wheel deceleration (control of reducing the brake fluid pressure), (2)

activation of the ABS control based on the target slip ratio (control of reducing the brake fluid pressure), (3) maintenance of the current brake fluid pressure, and (4) increase in the brake fluid pressure in response to the operational amount of the brake levers 16 operated by the rider, based on the processing results and the like from the deceleration threshold computing section 54 and the slip ratio threshold computing section 56.

The valve control computing section 58 then supplies to the valve control unit 40 the signals for opening and closing the valves corresponding to the determined control mode. This causes the valve control unit 40 to open and close the valves based on the control mode determined by the valve control computing section 58 and the supplied opening and closing signals to adjust the brake fluid pressure.

In this embodiment, the valve control computing section 58 places a higher priority on the control mode (2) for the ABS control while the motorcycle 12 travels straight ahead and, on the other hand, places a higher priority on the control mode (1) for the ABS control during turning. In a case where no ABS control is performed, the control mode (3) or (4) is performed.

Figure 7:
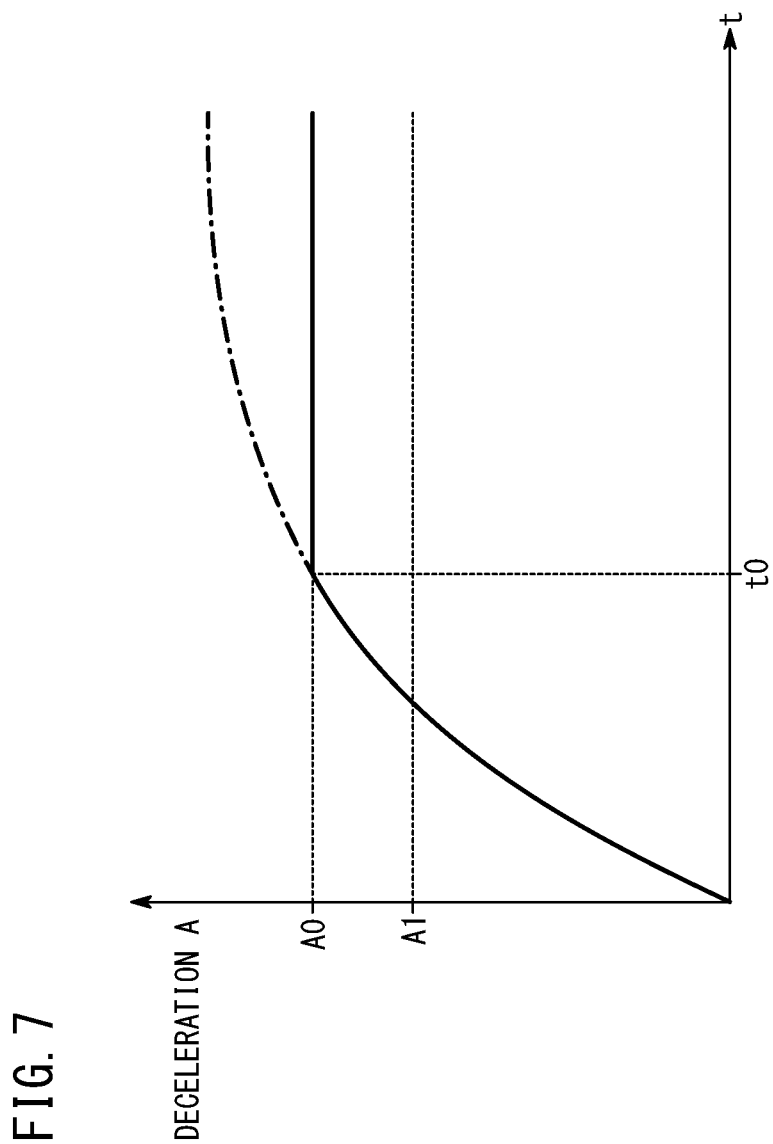
FIG. 7 is a timing chart for a case where ABS control is performed based on slip.
Figure 8:
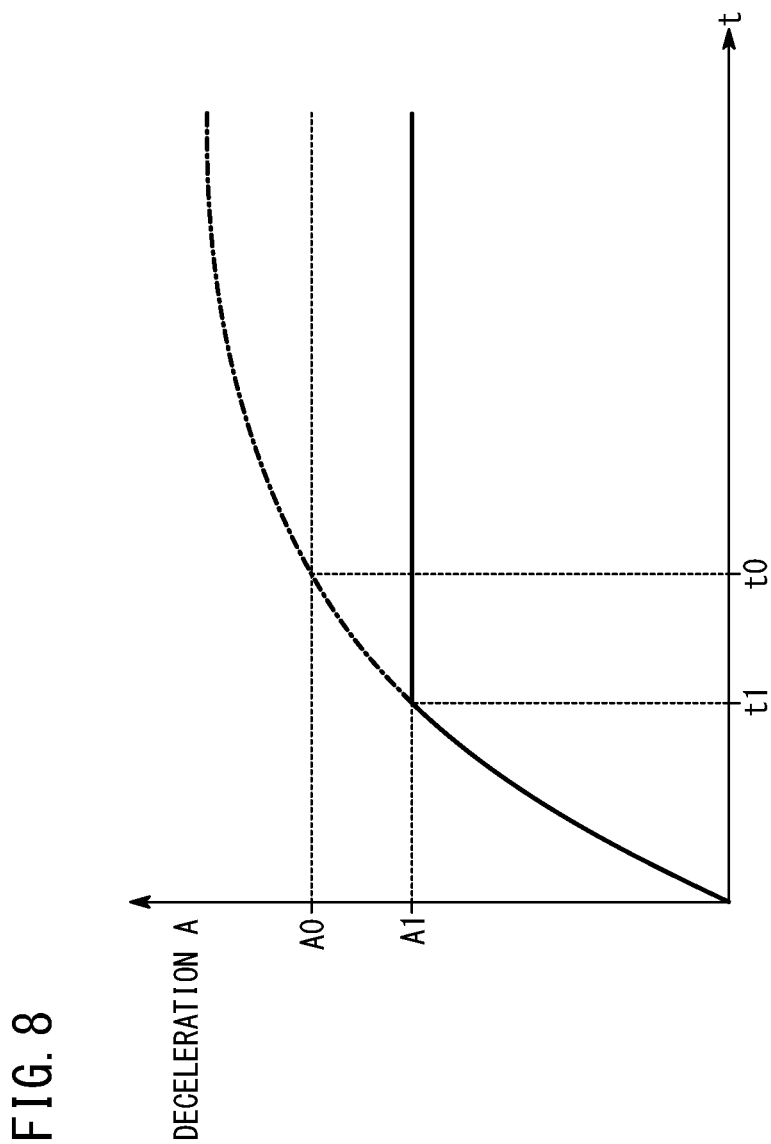
FIG. 8 is a timing chart for a case where the ABS control is performed based on the deceleration.
Figure 9:
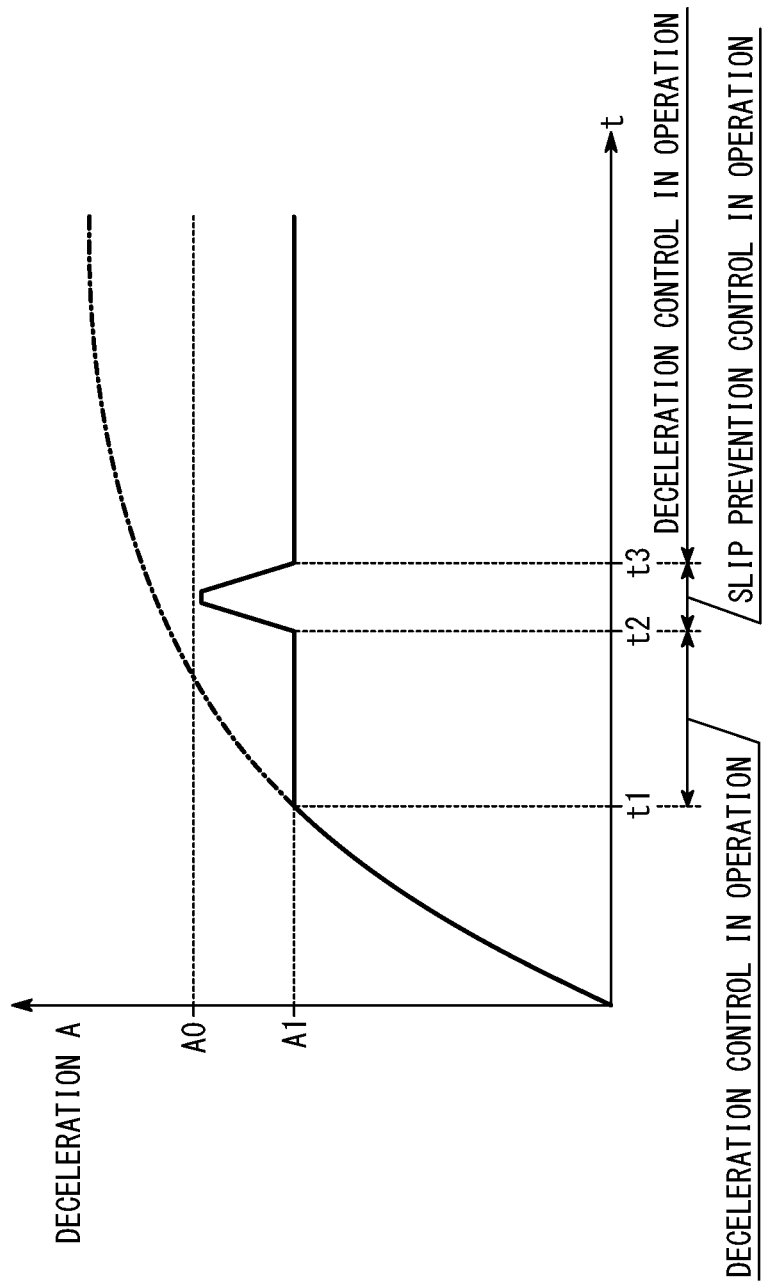
FIG. 9 is a timing chart for a case where slip prevention control is performed while the ABS control is being performed based on the deceleration.

FIGS. 7 to 9 are timing charts illustrating the ABS controls performed by the valve control computing section 58.

FIG. 7 is a timing chart illustrating a case where the control mode (2)—the ABS control based on the target slip ratio—is performed for an arbitrary bank angle α. In this case, when the deceleration A increases with time t in response to the operation of the brake levers 16 by the rider during turning of the motorcycle 12 and reaches a deceleration A0 corresponding to the target slip ratio determined based on the map in FIG. 6 at a time point t0, the valve control computing section 58 determines the activation of the ABS control based on the control mode (2) and supplies the signals for opening and closing the valves according to the control mode (2) to the valve control unit 40. This causes the valve control unit 40 to open and close the valves based on the supplied opening and closing signals and to adjust the brake fluid pressure intermittently. As a result, the deceleration A is maintained at the value A0 after the time point t0.

In this case, however, it is possible that the rider feels discomfort with the external force acting on the handlebars 14 at a deceleration A1 lower than the deceleration A0 when the rider turns the motorcycle 12 at the bank angle α.

Thus, in this embodiment, the valve control computing section 58 starts performing the ABS control according to the control mode (1) at a time point t1 at which the deceleration A1 is lower than the deceleration A0.

Specifically, as illustrated in the timing chart in FIG. 8, in a case where the deceleration A increases with the time t in response to the operation of the brake levers 16 by the rider during turning of the motorcycle 12, the valve control computing section 58 determines the activation of the ABS control based on the control mode (1) when the deceleration A reaches the deceleration A1 (deceleration corresponding to the target wheel deceleration) at the time point t1 which is before the time point t0, and supplies to the valve control unit 40 the signals for opening and closing the valves according to the control mode (1).

This causes the valve control unit 40 to open and close the valves based on the supplied opening and closing signals to adjust the brake fluid pressure intermittently. As a result, the deceleration A is maintained at the value A1 after the time point t1. Accordingly, in the case illustrated in FIG. 8, the external force acting on the handlebars 14 is less likely to make the rider gripping the handlebars 14 feel discomfort.

The alternate long and short dash lines in FIGS. 7 and 8 indicate the deceleration A changing over time when the braking force acts in response to the operational amount of the brake levers 16 in a case where the ABS control based on the control mode (1) is not performed.

In FIG. 8, the ABS control is performed based on the deceleration A1. On the other hand, the deceleration A0 corresponds to the target slip ratio determined at the slip ratio threshold computing section 56. Thus, it seems that simply setting the target slip ratio low may achieve the control as illustrated in FIG. 8.

However, the control similar to the control illustrated in FIG. 8 cannot be achieved only by setting the target slip ratio low for the following reasons.

First, the accuracy in calculating the slip ratio S is low in the area where the deceleration A is low. More specifically, the slip ratio S is detected based on the wheel speeds of the front wheel 24 and the rear wheel 26. In this case, the front wheel 24 and the rear wheel 26 are each formed of a wheel and a rubber tire mounted on the wheel and rotate while the rubber tires are compressed during traveling. In a case where the front wheel 24 and the rear wheel 26 are compressed differently, the difference affects the accuracy in calculating the slip ratio S. In addition, if the rubber tires do not firmly grip the road surface 66, it is difficult to calculate the required slip ratio S due to the differences in the size of the front wheel 24 and the rear wheel 26, the state of the road surface 66, and the contact area with the road surface 66, etc.

Moreover, the motorcycle 12 slips in various manners, resulting in difficulty in defining the slip ratio S. Furthermore, it is difficult to calculate the slip ratio S when the motorcycle 12 passes through certain points such as manholes described below.

For the above-described reasons, the brake control device 10 according to this embodiment performs the ABS control based on the deceleration A1 instead of the slip ratio S.

FIG. 9 is a timing chart illustrating the brake control when the motorcycle 12 passes through a point on the road surface 66 with a low frictional coefficient μ during the ABS control based on the deceleration A1. The point with a low frictional coefficient μ is the road surface 66 with, for example, manholes or sand.

In this case, when the motorcycle 12 on which the ABS control based on the deceleration A1 is performed from the time point t1 passes through the point with a low frictional coefficient μ during a time period between a time point t2 and a time point t3, the deceleration A increases temporarily. This is because traveling on the road surface 66 with a low frictional coefficient μ causes the tire slip to increase temporarily, increasing the deceleration A based on the wheel speeds detected by the front wheel rotational speed sensor 32 and the rear wheel rotational speed sensor 34 at the front wheel 24 and the rear wheel 26.

When the slip increases temporarily as above and exceeds a permissible value, the ABS control based on the deceleration A1 according to the control mode (1) is suspended and temporarily switched to the ABS control based on the slip according to the control mode (2). Therefore, although the rider may feel discomfort with the external force acting on the handlebars 14 during the time period between the time point t2 and the time point t3, the brake control to prevent slip takes precedence, and the ABS control based on the control mode (2) is performed as an exceptional measure.

Subsequently, at the time point t3 when the deceleration A decreases to A1, the control mode is switched back from (2) to (1) again, and the ABS control based on the deceleration A1 is performed after the time point t3.

Effects of the Embodiment

As described above, the brake control device 10 according to this embodiment has the control mode (2) in which the slip ratio threshold computing section 56 performs the brake control on the motorcycle 12 to limit the slip to a predetermined range and the control mode (1) in which the deceleration threshold computing section 54 performs the brake control to limit the deceleration A to a predetermined range based on the bank angle α. Thus, in this embodiment, the brake control is performed not only preventing the slip but also limiting the deceleration A to a predetermined range.

More specifically, according to a study by the inventors, when the slip ratio threshold computing section 56 performs the brake control to limit the slip during turning of the motorcycle 12, it is possible that the rider feels discomfort with the external force acting on the handlebars 14. To prevent or reduce the discomfort of the rider, the brake control needs to be started at an early stage before the brake control according to the slip prevention starts.

Consequently, in this embodiment, the brake control based on the deceleration A is performed at the timing (time point t1) prior to the timing (time point t0) when the brake control with slip prevention is performed. In this manner, increasing chances of the brake control based on the deceleration A at a relatively early timing enables control of the braking force such that the rider does not feel discomfort with the external force acting on the handlebars 14 during turning of the motorcycle 12.

Stabilizing the braking during turning also creates an additional sense of safety in the rider.

Moreover, in this embodiment, the brake control by the deceleration threshold computing section 54 coexists with the brake control by the slip ratio threshold computing section 56. This enables the brake control by the deceleration threshold computing section 54 to be suspended and temporarily switched to the brake control by the slip ratio threshold computing section 56 when the slip increases and exceeds a predetermined range temporarily during the brake control by the deceleration threshold computing section 54. As a result, the brake control to prevent the slip takes precedence.

Furthermore, in this embodiment, the deceleration threshold computing section 54 may perform the brake control only on the disc brake 20 for the front wheel. This allows the disc brake 22 to receive input of braking operation by the rider from when the braking by the disc brake 20 on the front wheel 24 starts until the braking by the disc brake 22 for the rear wheel on the rear wheel 26 starts even in a case where the brake control by the deceleration threshold computing section 54 can be activated. As a result, the rider scarcely feels discomfort with the operation of the brake of the rear wheel 26.

Moreover, as the absolute value of the bank angle α increases, the limit value of the deceleration (the threshold of the target wheel deceleration) causing discomfort in the rider at the handlebars 14 decreases. This enables the target wheel deceleration (deceleration A1) to be controlled into appropriate values.

Furthermore, since the deceleration A that does not causing discomfort in the rider is provided as the map 68 that corresponds to the bank angle α, the brake control suitable for the characteristics of the motorcycle 12 is readily performed using the map 68.

In this case, the motorcycle 12 is in a substantially upright position when the absolute value of the bank angle α is less than or equal to the first predetermined value α1. In this state, a larger braking force is applied by not limiting the deceleration A. As a result, an appropriate brake control is performed without degrading the usability of the brakes by the rider.

Moreover, the target wheel deceleration is limited to a certain value or less at a very large bank angle α of which the absolute value is greater than or equal to the second predetermined value α2. In this way, a braking force takes precedence over discomfort felt by the rider due to the effect of the external force acting on the handlebars 14. As a result, more stable brake control is exhibited. Although a preferred embodiment of the present invention is described above, the technical scope of the present invention is not limited to the range described in the above-described embodiment. It will be easily understood by persons skilled in the art that various modifications or improvements can be made to the above-described embodiment. It is clear from the description of the claims that modes including such modifications or improvements are also included in the technical scope of the present invention. Moreover, signs in parentheses described in the claims are added in accordance with the signs in the accompanying drawing for easier understanding of the present invention, and the present invention should not be construed to be limited to the elements with the signs.

The invention claimed is:

1. A brake control device for a motorcycle, including a deceleration estimating unit configured to estimate deceleration of a vehicle, a bank angle estimating unit configured to estimate a bank angle of the vehicle, and a slip preventing unit configured to detect slip of a wheel and to control a brake of the vehicle to limit the slip to a predetermined range, further comprising:
   a deceleration limiting unit configured to control the brake to limit the deceleration of the vehicle to a predetermined range based on the estimated bank angle,
   wherein:
   with a map in which the bank angle and a threshold of the deceleration are related to each other for each speed of the wheel, the deceleration limiting unit acquires, for the estimated bank angle, the target deceleration that is less than or equal to a threshold and the deceleration limiting unit controls the brake, setting the acquired target deceleration as a target wheel deceleration,
   when the slip exceeds the predetermined range while the deceleration limiting unit controls the brake, the control of the brake by the deceleration limiting unit is switched to the control of the brake by the slip preventing unit, and
   the control of the brake by the deceleration limiting unit starts from a time point at which the deceleration of the vehicle is lower than a target slip deceleration corresponding to a target slip obtained by the slip preventing unit.

2. The brake control device for the motorcycle according to claim 1, wherein:
   the deceleration limiting unit limits the deceleration to a smaller value as an absolute value of the estimated bank angle increases.

3. The brake control device for the motorcycle according to claim 2, wherein:
   the deceleration limiting unit limits the deceleration according to the estimated bank angle.

4. The brake control device for the motorcycle according to claim 3, wherein:

the deceleration limiting unit does not perform a process of limiting the deceleration when the absolute value of the estimated bank angle is less than or equal to a first predetermined value.

5. The brake control device for the motorcycle according to claim 3, wherein:

the deceleration limiting unit limits the deceleration to a certain value or less when the absolute value of the estimated bank angle is greater than or equal to a second predetermined value.

6. The brake control device for the motorcycle according to claim 1, wherein:

in the map, the bank angle and the threshold of the deceleration are related to each other for each speed of a front wheel of the motorcycle.

7. A brake control device for a motorcycle, including a deceleration estimating unit configured to estimate deceleration of a vehicle, a bank angle estimating unit configured to estimate a bank angle of the vehicle, and a slip preventing unit configured to detect slip of a front wheel and to control a brake of the vehicle to limit the slip to a predetermined range, further comprising:

a deceleration limiting unit configured to control the brake to limit the deceleration of the vehicle to a predetermined range based on the estimated bank angle, wherein:

with a map in which the bank angle and a threshold of the deceleration are related to each other for each speed of the front wheel of the motorcycle, the deceleration limiting unit acquires, for the estimated bank angle, the target deceleration that is less than or equal to the threshold and the deceleration limiting unit controls the brake, setting the acquired target deceleration as a target wheel deceleration, and the control of the brake by the deceleration limiting unit starts from a time point at which the deceleration of the vehicle is lower than a target slip deceleration corresponding to a target slip obtained by the slip preventing unit.

* * * * *